US006563529B1

(12) United States Patent
Jongerius

(10) Patent No.: US 6,563,529 B1
(45) Date of Patent: May 13, 2003

(54) INTERACTIVE SYSTEM FOR DISPLAYING DETAILED VIEW AND DIRECTION IN PANORAMIC IMAGES

(76) Inventor: Jerry Jongerius, P.O. Box 4879, Seaside, FL (US) 32459-4879

( * ) Notice: Subject to any disclaimer, the term of this patent is extended or adjusted under 35 U.S.C. 154(b) by 0 days.

(21) Appl. No.: 09/416,505

(22) Filed: Oct. 8, 1999

(51) Int. Cl.[7] .............................. H04N 7/00; H04N 7/18; H04N 5/45; G09G 5/00

(52) U.S. Cl. ...................... 348/36; 348/144; 348/565; 345/629

(58) Field of Search ............................. 348/36, 37, 38, 348/39, 580, 147, 144, 563, 564, 565; 345/629, 419, 619, 848, 420; 382/154, 284, 294; H04N 7/18

(56) References Cited

U.S. PATENT DOCUMENTS

| | | | |
|---|---|---|---|
| 5,040,055 A | | 8/1991 | Smith ........................... 358/87 |
| 5,444,478 A | * | 8/1995 | Lelong et al. ................. 348/39 |
| 5,495,576 A | * | 2/1996 | Ritchey ........................ 345/420 |
| 5,563,650 A | * | 10/1996 | Poelstra ........................ 348/36 |
| 5,588,914 A | | 12/1996 | Adamczyk ..................... 463/32 |
| 5,754,189 A | | 5/1998 | Doi et al. .................... 354/473 |
| 5,764,217 A | | 6/1998 | Borrel et al. ................ 345/156 |
| 5,917,495 A | | 6/1999 | Doi et al. .................... 345/419 |
| 6,121,966 A | * | 9/2000 | Teodosio et al. ............ 345/838 |
| 6,246,413 B1 | * | 6/2001 | Teo .............................. 345/419 |
| 6,392,658 B1 | * | 5/2002 | Oura ............................ 345/629 |
| 6,434,265 B1 | * | 8/2002 | Xiong et al. ................. 382/104 |

OTHER PUBLICATIONS bamboo.com, Inc. web site, www.bamboo.com/take_a_tour/index.html, first seen on Internet Mar. 1, 1999.
Harvard Office of News and Public Affairs web site www.h-no.harvard.edu/tour/qtrv_tour/index.htm, First seen on Internet Aug. 26, 1999.
Advanced Relational Technology Inc. web site, http://www.chiefarchitect.com, Jul. 1999.

* cited by examiner

Primary Examiner—Gims S. Philippe
(74) Attorney, Agent, or Firm—David Pressman

(57) ABSTRACT

A method and system for indicating the camera position, direction, and field of view in a map or panoramic image comprises a map image window which displays a map or panoramic image of the site to be studied (house, apartment, city, etc.). A detailed view window displays a portion of the map image, taken from a point in the site. A highlighted sector in the map image represents the viewing position, direction, and field of view that the detailed view window displays. When the user changes the field of view in the detailed view window, the highlighted sector in the map image changes in synchronism. The resulting interactive windows allow a person to easily and quickly view and understand the field of view, position, and direction of the image being displayed in the detail view window.

28 Claims, 3 Drawing Sheets

(3 of 3 Drawing Sheet(s) Filed in Color)

Microfiche Appendix Included
(1 Microfiche, 18 Pages)

INTERACTIVE SYSTEM FOR DISPLAYING DETAILED VIEW AND DIRECTION IN PANORAMIC IMAGES

MICROFICHE APPENDIX

Included with this application is a single-fiche microfiche appendix of 18 frames, which contains the programs pmvr.java (11 frames) and FloorPlan.java (7 frames); these implement the present invention.

COLOR DRAWINGS

The file of this patent contains at least one drawing (photograph) executed in color. The Patent and Trademark Office will, upon request and payment of the necessary fee, provide copies of this patent with color drawings.

RESERVATION OF COPYRIGHT

A portion of this patent application contains material in which applicant claims copyright protection. Applicant has no objection to the reproduction by anyone of this application or patent as it appears in the Patent and Trademark Office, but reserves all other rights whatsoever, including the right to reproduce and use the software programs included with such patent application.

BACKGROUND

1. Field of Invention

This invention relates to viewing panoramic images, specifically to an improved method for displaying a detailed field of view and a direction when viewing panoramic images.

2. Description of Prior Art

Using panoramic images to present virtual (computer-simulated) tours of real physical environments is becoming commonplace. Many virtual tours use 360° panoramic images and employ a detail viewer. The viewer displays a portion of the panoramic image and provides a method for panning throughout the image. Panning is usually accomplished by using a mouse or keyboard input device.

A common viewer used to create these tours is sold by Apple Computer Corp. of Cupertino, Calif. under the trademark QUICKTIME VR. It provides a way to view panoramic images from a web site by using a web browser. Other companies provide services and software to create virtual tours for the real estate industry. E.g., such software is found under the trademark BAMBOO at the Internet site www.bamboo.com, and IPIX at www.ipix.com.

While these systems provide tours that contain many detailed views of rooms, it is difficult to understand how all the views or rooms relate to each other and which direction the user is facing. E.g., if a prospective real estate purchaser takes a virtual tour of a house and goes to the living room, then the dining room, then the kitchen, etc., the software enables the prospect to visit these rooms in any order and to see them in detail. However it does not indicate how the rooms interrelate physically, in which direction the prospect is proceeding as they move through the house, and where the rooms are in relation to each other and in the overall scheme, i.e., the layout of the house.

Thus, although these virtual tours have a good appearance, they do not help the individual to understand fully the field of view, direction, and relation of the detailed views to the overall layout because the tours display only detailed views of panoramic images. Some web sites display panoramic images along with maps of the panoramic image, but the maps are static and are only used to select which image to view. I.e., the static map image does not help the individual to fully understand the field of view, direction, and relation to the overall layout.

An architectural design software package, sold under the trademark CHIEF ARCHITECT at www.chiefarch.com, allows a user to in effect to place a virtual camera on a spot on a floor plan and have a window appear on the screen to indicate the camera's field of view in a map window. (Two short, fixed-length diverging lines on the floor plan indicate a sector seen by the camera and thus indicate the camera's field of view.) But if the user changes the field of view in this window by resizing it, moving controls bars, or using an "elevator" (a block in the vertical side column), the "camera's" orientation on the floor plan remains unchanged and will thereby become inaccurate. This program also has a reverse disadvantage: If the user moves the camera on the floor plan, the map window does not immediately change to reflect the new camera position or orientation until after the user clicks in the map window. Thus the display can be very misleading because the two windows (the detailed view and the map window) will often be out of synchronization (sync).

OBJECTS AND ADVANTAGES

Accordingly, several objects and advantages of my invention are:

(a) to provide an improved virtual image viewing and panning system, (b) to provide such a system in which part of a panoramic image is represented in a detailed image, the location of which is shown in an improved map image, (c) to provide a detail viewer in which a user will understand the field of view that is shown in this view and in which direction it is taken, (d) to provide such a viewer in which it is much easier for the user to understand direction without any prior knowledge of the physical location of the panoramic image, and (e) to provide such a viewer in which the detailed image and the map image are never be out of sync because any change in the detailed image is immediately reflected in the map image, and any change in the map image is immediately reflected in the detailed image.

Other objects and advantages are:

(f) to provide a viewer for viewing detail in a panoramic image in association with a map that shows the location of the detailed image in the panoramic image, (g) to provide such a viewer in which, when the detailed image changes, the map shows a highlight indicating this new detailed image, and (h) to provide such a viewer in which detailed image or field of view is highlighted or otherwise indicated to provide a frame of reference for those who have never physically been to the location.

Further objects and advantages will become apparent from a consideration of the drawings and ensuing description.

DRAWINGS

Figure 1:
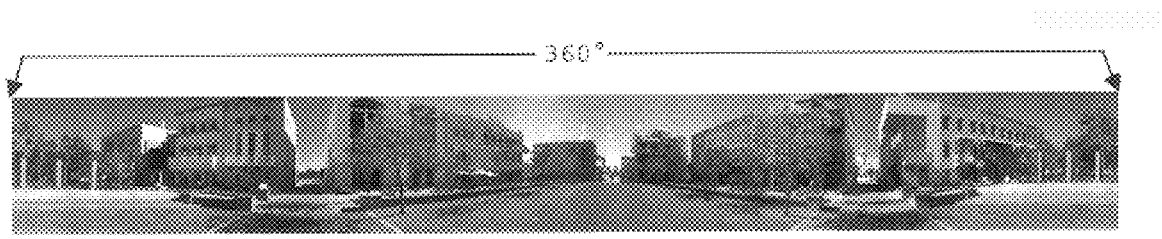
FIG. 1 (prior art) shows a computer linear display or photo of a full (360°) panoramic image of a shopping area, ready to be viewed with a detail viewer in accordance with the invention.

REFERENCE NUMERALS 10 compass rose
30 dot representing camera
32 field of view angle
34 highlighted view area or arc
36 new highlighted view area or arc
38 new map
40 new detailed field of view
60 detailed view of Great Room
62 map of floor plan incl. room 60
64 highlighted sector in map 62
66 detailed view of porch
68 map of area incl. Porch
70 highlighted sector in map 68

SUMMARY

In accordance with the invention, I provide an improved method for showing a detailed field of view of a panoramic image and a map of the area covered by the panoramic image that indicates the direction and area over which the detailed field of view is taken. The detailed field of view is presented in one window and displays a portion of the panoramic image. The map is presented in another window and has a sector that is highlighted or contrasted from the rest of the map to indicate the point of origin and direction of the detailed image. When the user changes the field of view in the detailed field of view window, the highlighted sector changes accordingly. The resulting interactive windows allow a person easily and quickly to view and understand the field of view and direction of the image being displayed in the detailed field of view window. The panoramic image may be of an outside or inside area.

Figure 2:
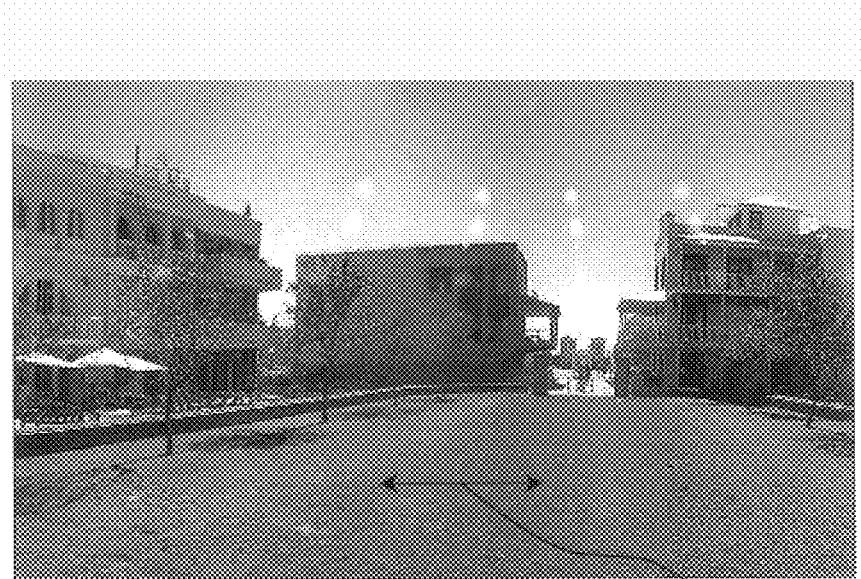
FIG. 2 (prior art) shows a similar photo of a detailed or enlarged view of a portion of the panoramic image of FIG. 1.

Description—FIGS. 1 & 2—Prior-art Panoramic & Detailed Views of Shopping Area

Prior to describing the viewer of the invention, I will first describe a typical panoramic image and a detail view window and the problem with using these images, which is solved by the present viewer.

FIG. 1 (prior art) shows a sample full (360°) panoramic image of an area, in this case a portion of a shopping area, Ruskin Place, in Seaside, Fla. It was taken with multiple successively rotated exposures using a digital camera to take a series of pictures and splicing the pictures together to form the 360° image, but it can also be taken with fewer exposures using a camera with a panoramic or 180° (or narrower) lens. Alternatively it can be taken with a plurality of separate cameras operating simultaneously, each with a relatively narrow field of view, with their separate images electronically spliced together to form the 360° composite image.

The image of FIG. 1 is displayed in a linear window in a computer screen by a conventional image display program from a computer file formed by scanning the panoramic photo (not shown) or inputting an electronic file representing the image directly into the computer. The image of FIG. 1 is typically used in any of many ways, e.g., to orient a newcomer to an area, or to plan modifications to an area. The image of FIG. 1, being a fully clear 360° image, shows much more than can be seen by a human since a human's view angle is limited to about 140°, and of this, only about 30° to 50° is clear or in focus.

FIG. 2 (prior art) shows a detailed or close-up view of a center portion (about 80°) of the panoramic image of FIG. 1. It can also be displayed on the same computer screen in a separate window by the same imaging program. Note that the detailed view of FIG. 2 is identical to a center portion of the panoramic image of FIG. 1, albeit enlarged.

The detailed view of FIG. 2 is very useful since it shows the details of a portion of the panoramic image of FIG. 1. The portion shown in FIG. 2 is in the center of the panoramic image of FIG. 1, but if the user is interested in any other portion of the panoramic image, the detail view can be moved to view any other portion easily. E.g., if the user wants to see a detail of an area to the right of the center area shown in FIG. 2, they simply position the cursor of their mouse in FIG. 2. Then they depress and hold down the mouse button (usually the left button on a multiple-button mouse), and move or drag the cursor to the right. This will cause the portion of the panoramic image of FIG. 1 shown in FIG. 2 to change and move, just as if the user were actually standing and turning to the right.

While the above views are useful, they do not show the user which portion of the panoramic image they are viewing and how the area viewed is changing. Thus to determine what portion of the panoramic image is being viewed, the user must locate the buildings or features shown in FIG. 2 in FIG. 1. This may not be too difficult with the simple and unique arrangement of buildings and features in FIGS. 1 and 2, but can be very difficult with other areas, such as those which show flora, the inside of a building, etc.

As stated, one system shows a map of the area with the detailed area indicated, but when the detailed area is changed, the indication on the map does not change unless special additional steps are taken. This is highly disadvantageous since it requires the user to take intermediate steps and interrupt their viewing and scanning. This causes the user to lose their orientation and severely limits their understanding of the area.

Figure 3:
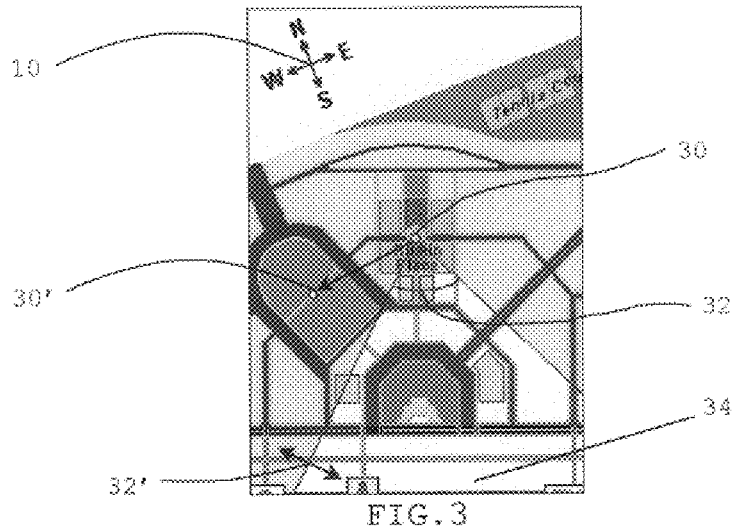
FIG. 3 depicts a window showing a map which includes the area covered by the panoramic image of FIG. 1, and one method of indicating the area and direction of the detailed field of view of FIG. 2, in accordance with the invention.
Figure 4:
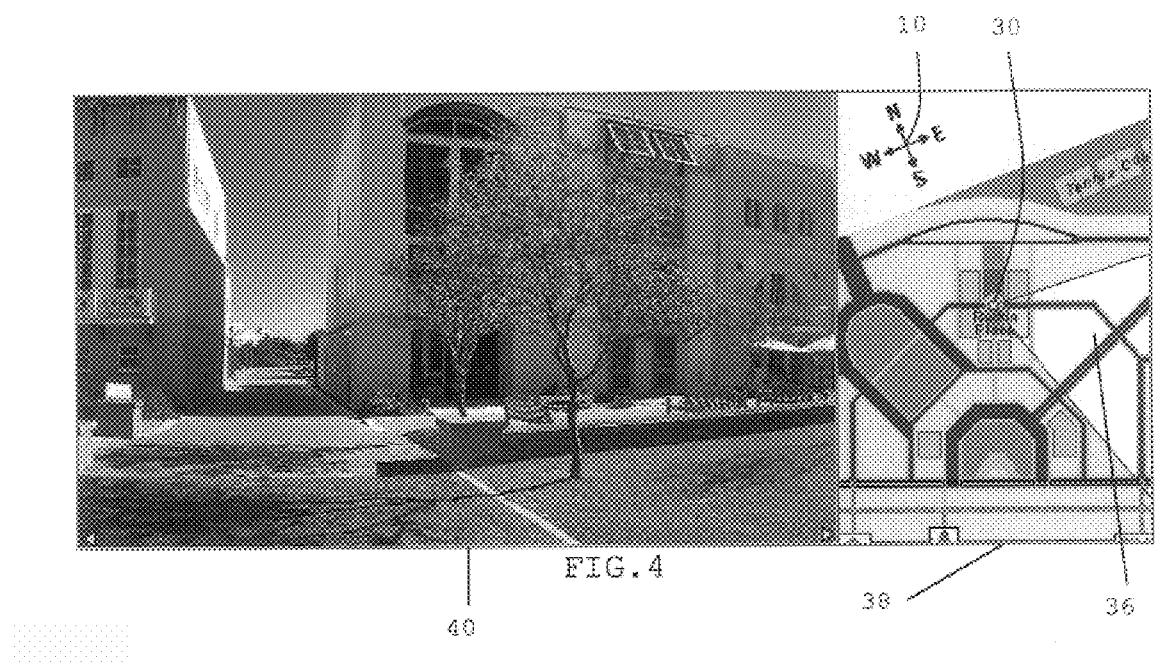
FIG. 4 shows a computer display window showing a presently preferred layout of a detailed view adjacent a map of the panoramic image of FIG. 1, with the detailed view taken from a different direction than FIG. 2 and the map indicating this different direction, in accordance with the invention.

Description—FIG. 3—Map Image & FIG. 4— Combined Views of Shopping Area

FIG. 3 shows a partial map of a town, which, in accordance with the invention, depicts a bird's-eye view 3f the area covered by the panoramic image of FIG. 1. I.e., it shows the buildings seen in FIG. 1, plus some additional surrounding area not seen in the panoramic image of FIG. 1. The map image of FIG. 3 may also be displayed on the same computer screen in a separate window. It is displayed using an imaging program in the same manner as with the images of FIGS. 1 and 2. The map of FIG. 3 includes a compass rose or crosshairs 10 to show geographical directions.

The position of the camera from which the panoramic image has been taken is represented by a dot 30, preferably in a contrasting color, such as yellow as shown. The camera indicated has a field of view or viewing angle of about 80°, generally in a South-South-East (SSE) direction so as to view an area 34 of FIG. 3 covered by angle 32. Viewed area 34 is highlighted (i.e., it is lighter than the rest of the map, which is made darker) to show visually the area of FIG. 1 that FIG. 2 details.

FIG. 4 is similar to FIGS. 2 and 3, except that it combines the two windows into one window with two sections, a left section 40—the detailed field of view, and a right section 38—the map. The single widow of FIG. 4 is the presently preferred embodiment since, by combining both windows into one, is simpler in appearance. As will be explained, detailed field of view 40 shows a new area of the panoramic view of FIG. 1 slightly to the left of the view of FIG. 2, while map 38 shows a new highlighted view area 36, rotated slightly counter-clockwise (CCW) from view area 34 of FIG. 2.

Basic Operation—FIGS. 1 to 4

As indicated above, the user can change the field of view of FIG. 2. I.e., the user simply positions the cursor (not shown) of their mouse (not shown) anywhere in FIG. 2. Then they depress and hold down the mouse button (usually the left button on a multiple-button mouse), and move or drag the cursor to the right or to the left. This will cause the portion of the panoramic image of FIG. 1 shown in FIG. 2 to change and move, just as if the user actually stood at location 30 and turned to the right or left.

When the user changes the field of view of FIG. 2 in this manner, the highlighted sector or arc displayed in the map (FIG. 3) simultaneously rotates and always shows the actual sector displayed in FIG. 2.

E.g., assume that the user positions the cursor anywhere in FIG. 2 to the left of the right border and drags the cursor slightly to the left. FIG. 2 will change as follows: the image will move to the right as the cursor is moved to the left so as to display an area to the left of the center area of FIG. 1, as shown by new detailed view window 40 in FIG. 4.

The detailed view will change in the same manner as if a person standing at location 30 in FIG. 3 and looking in the SSE direction to see field of view 34 of FIG. 3 turned their head slightly to the left. The person would then view in the generally ESE direction as shown by field of view 36 in map 38 at the right-hand side of FIG. 4.

Simultaneously highlighted sector or arc 34 of FIG. 3 will rotate CCW to highlight new field 36 in FIG. 4 and the actual area being viewed. The highlighted area will still cover an angle or arc 32, which will be approximately 80°, but may change slightly because of imperfections in the images. Thus when the viewed arc is moved, one of the lines bounding the highlighted arc may move faster or slower than the other line to reflect this.

As stated, movement of the field of view can be effected by dragging the cursor in the detailed view of FIG. 2, or in the detailed view window 40 of FIG. 4. Movement of the field of view can also be effected by clicking and dragging the cursor in the map of FIG. 3 or map window 38 of FIG. 4. I.e., the user would position the cursor anywhere in the map of FIG. 3, or anywhere in map window 38 of FIG. 4. The user left clicks and holds down the mouse button and drags the cursor approximately clockwise (CW) or CCW.

The highlighted arc will rotate in the selected direction. E.g., if the highlighted sector is looking in the SSE direction as shown in FIG. 3 and the cursor is cragged up or CCW, the highlighted arc will move slightly CCW, as shown by arc 36 in image 38 of FIG. 4. Thus the field of view can be changed by clicking and dragging in either the map or the detailed field of view window.

In FIG. 4, detail view window 40 is positioned adjacent and joined to map 38. As stated, this is the presently preferred arrangement, but the arrangement of FIGS. 2 and 3, where the windows are separated, will also operate in an identical manner.

Thus whenever the user changes the field of view in FIG. 2 (or window 40 of FIG. 4) in either direction, the highlighted sector or view shown in FIG. 3 (or window 38 of FIG. 4) will automatically and simultaneously change to show the new field of view. This will enable to user to always see exactly what part of the panoramic image they are viewing. The user will obtain a much better understanding of the field of view and direction, and hence of the area being viewed.

The above example can be experienced interactively online at the following site:

http://www.duckware.com/patent.html.

Relocation of Camera—FIGS. 1 to 4

In addition to showing a panoramic map of the geographical area and a detailed view of any selected portion of the area in another window, the program can be used to move the map as if the camera were moved to another location. The map will change accordingly to show a new map of the area, as seen from the new camera location, with the camera location being located in the approximate center of the new map.

In the example shown in the above site, the camera's position can be moved to inside a building and the detailed view (FIG. 2 or 40 in FIG. 4) will show the room and the map (FIG. 3 or 38 in FIG. 4) will show a map of the room. The detailed view will change to reflect the new camera location and can be moved throughout the new map as before. The above programs (in microfiche in the file of this patent) will effect this operation. This is illustrated in FIG. 3 by new camera location 30', which has been moved from original camera location 30 by the arrow connecting original location 30 with new location 30'.

Automatic Panning—FIGS. 1 to 4

The manual movement of the detailed view discussed above under Basic Operation can be done automatically within the program. This automatic panning is configured by the designer of the HTML page containing the detailed pmvr viewer by inserting the following line into the param section of the pmvr applet (section of the HTML document):

<param name="auto" value="1">

For example, an automatic panning capability can be added to the test.html document described below by inserting this single line just after the "pixdeg" line.

When automatic panning occurs, field-of-view sector 32 will rotate around slowly in either direction, as indicated by arrows 32' in FIG. 3. During this movement, the detailed view (FIG. 2 or 40 in FIG. 4) will automatically pan in a corresponding movement. This movement can be seen at the above duckware site. The manual panning operation can still be used and will override the automatic panning operation.

Method of Installing and Using System—FIGS. 1 to 4

To install and use the system, a programmer need merely install the above two source programs (pmvr.java and FloorPlan.java) into a working directory on any computer having the following installed programs: (1) a Java compiler (to translate the Java source code into Java class files), and (2) a Java-enabled web browser.

Then the Java source files are compiled into Java-class files. This is done by using a program, Java Development Kit (JDK), sold by Sun Microsystems, and issuing the following commands:

javac pmvr.java javac FloorPlan.java

After these commands are run, the current working directory will contain the compiled programs. Namely, pmvr.java will be compiled and produce a file named pmvr.class, and FloorPlan.java will be compiled and produce a file named FloorPlan.class.

Then a 360° panoramic image, such as the one of FIG. 1, is installed on the computer's hard disk in the working directory under the name panoramic.jpg, in JPEG format.

Next a map image, such as the one in FIG. 3, is installed on the computer's hard disk in the working directory under the name map.gif, in GIF format. This map image is produced using a drawing program, such as that sold under the trademark MICROSOFT PAINT by Microsoft Corp. of Bellevue, Wash., from a map of the actual site shown in the panoramic image. E.g., an actual map is scanned with a scanner and opened with the drawing program. The resulting image is changed using the drawing program to eliminate any extraneous information and to provide the desired colors. Alternatively the map can be drawn by hand. The image is saved in GIF format under the name map.gif. (The actual names of the images are not important, but they must match the names used within the test.html document to be created next.)

The next step is to create an HTML document that uses both pmvr.class and FloorPlan.class to view the panoramic image and the map within a Java-enabled web browser. For example, the user creates an HTML document named test.html as follows:

<html>

<body>

<applet code=pmvr.class height=250 width=400>

<param name="image" value="panoramic.jpg">

<param name="view" value="360">

<param name="pixdeg" value="0=90,2000=90">

</applet>

<applet name=FloorPlan code=FloorPlan.class height= 250 width=200>

<param name="image" value="map.gif">

<param name="x" value="50">

<param name="y" value="100">

</applet>

</body>

</html>

Within the first pmvr applet (third line above) the 'height' (250) is usually set to be the height in pixels of the sample panoramic image. The 'width' (400) is usually set to around 20% the width of the panoramic image (2000, for example). Thus the applet presents a partial view of the panoramic.

The 'image' param value (next line above) is set to the file name of the saved panoramic image, which will be 'panoramic.jpg'.

The 'view' param value is set to '360' to indicate that the panoramic represents 360° of view.

The 'pixdeg' value is set to '0=90,2000=90' to indicate that the leftmost pixel (0) of the panoramic image is pointing due north (90) and that the rightmost pixel (2000) of the panoramic image is also pointing due north (90).

Within the second FloorPlan applet, the 'height' (250) is set to be the same as the pmvr applet, since they will usually be seen side by side next to each other.

The 'width' (200) is set to be the pixel width of the map image.

The 'image' param value must be set to the file name of the saved map image, which will be 'map.gif'.

The 'x' (50) and 'y' (100) param values specify the x and y pixel locations within the map image that represents the standing or viewing position (camera location) of the panoramic image.

The final step is to view the test HTML document, test.html, within a Java enabled web browser.

The web browser will show a view similar to FIG. 4, provided the panoramic image of FIG. 1 and the map of FIG. 3 are used. The interactive operation between the map image and the detailed view will operate as described above.

Alternatively the 'appletviewer' program within Sun's Java Development Kit can be used to view the test.html document. For example, running the command 'appletviewer test.html' results in two windows similar to FIGS. 2 and 3 being displayed.

In the attached programs, lines 122–130 and 290–316 of pmvr.java and lines 147–157 and 267–272 of FloorPlan.java generally constitute synchronization means. This means changes the portion of the panoramic image highlighted in the map in response to changes in the portion of the panoramic image shown in the detailed view, and vice-versa.

Lines 484–491 of pmvr.java generally constitute means for automatically changing the field of view at a predetermined interval.

Lines 417–433 of pmvr.java generally constitute means for enabling an operator to end such automatic changing.

Figure 5:
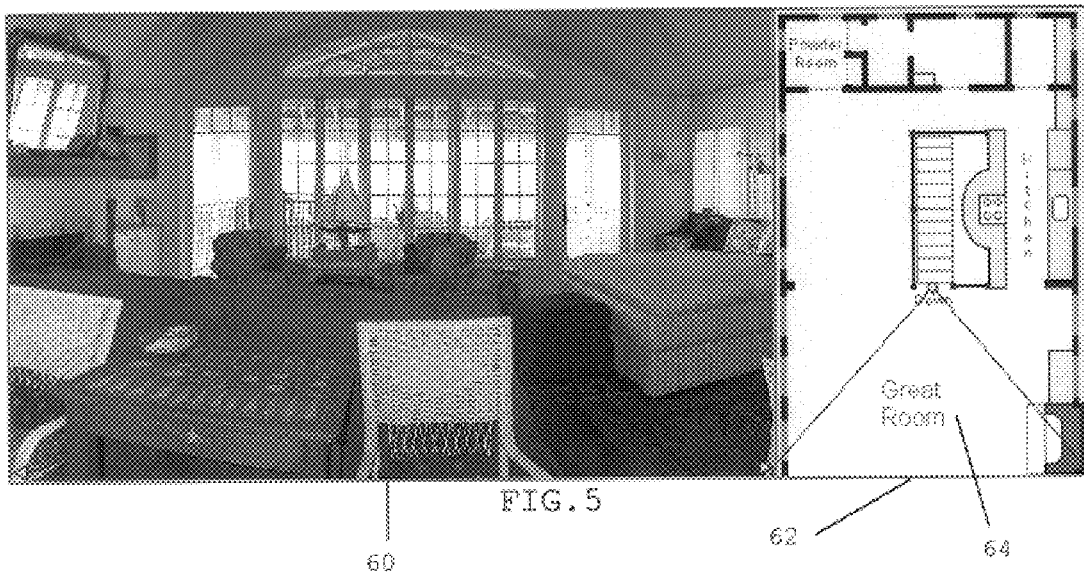
FIG. 5 depicts a window showing a detailed view of part of a room in the inside of a house in accordance with the invention, together with an adjacent map showing the location of the room in a floor plan of the house.
Figure 6:
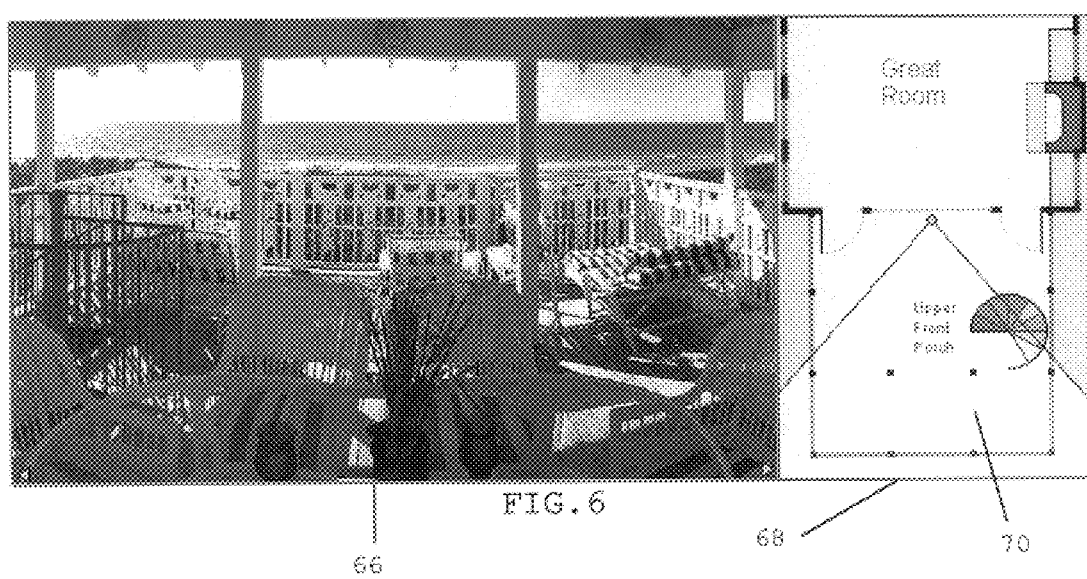
FIG. 6 depicts a window showing a detailed view of a covered porch of the house of FIG. 5, together with an adjacent map showing the location of the porch in the house floor plan.

FIGS. 5 & 6—Windows of Building Floor Plan and Rooms

The program can also be used to move through the rooms in a building. In this case the detailed view will show individual rooms and the map will show where the viewed room is in the overall floor plan.

FIG. 5 shows a computer screen window containing on its left side a detailed view 60 of a portion of a 'Great Room' of a private Gulf-front residence in Seaside, Fla. The detailed view shows a sector or arc, approximately 80° wide, of a 360° panoramic image (not shown). An adjacent map 62 on the right side of the window shows a floor plan with a highlighted sector 64 representing the area of view in detailed view 60.

When a mouse is moved within detailed view 60, the shape of the mouse cursor normally will be an arrow, but will change to a hand when the cursor is in a location where clicking will result in moving to a new room or location. For example, when the mouse cursor is moved to over a door to the left or right of the windows in the center of detailed view 60, it will change to a hand. Clicking on either door will cause the window of FIG. 5 to change to the window of FIG. 6.

FIG. 6 depicts a widow showing a detailed view 66 and adjacent floor plan map 68 of a covered porch that is adjacent to the Great Room of FIG. 5. Note that map 68 of FIG. 6 differs from map 62 of FIG. 5 in that map 68 is moved just outside the room to show the adjacent porch. In map 68, a sector 70 is highlighted to indicate the area of the porch in detailed view 66.

In addition to clicking on areas within a detailed view to move from one area to another area, it is also possible to click within areas on the map to move from area to area. For example, moving the mouse cursor over the 'Great Room' text in map 68 of FIG. 6 will result in the mouse cursor changing to a hand cursor. Clicking on the 'Great Room' text will result in the window of FIG. 5 being re-displayed.

The method of storing the map and detailed views of FIGS. 5 and 6 in the computer is similar to that of providing the images of FIGS. 1 to 4, discussed above when creating test.html, with the following exceptions:

(a) For FIG. 5, both 'image' params are set to view the new panoramic and map images; the 'height' is set to '304', 'pixdeg' is set to '0=102,750=0,1063=320, 1200=301,2400=102'; 'x' is set to '102'; and 'y' is set to '181 '.

(b) For FIG. 6, both 'image' params are set to view the new panoramic and map images; the 'height is set to '300'; 'pixdeg' is set to '0=5,1137=175'; 'x' is set to '100'; and 'y' is set to '347'.

The above examples can be experienced interactively online at the above duckware site.

CONCLUSION, RAMIFICATIONS, AND SCOPE

Thus the reader will see that I have provided an improved detail viewer for a panoramic image that can be used to view any part of the image by simply moving it across the image. While the image is viewed, a map of the area covered by the panoramic image is displayed with the detailed field of view highlighted. When the detailed field of view is changed, the highlighted area in the map simultaneously changes to show the area being viewed. This enables the user to be more easily acclimated to and understand an area being viewed and also to understand more fully the direction in which the detailed view is taken. The user can do this without any prior knowledge of the physical location of the panoramic image. The map and the detailed field of view are never out of sync because a change in the map is immediately reflected in the detailed view and a change in the detailed view is immediately reflected within the map. The map substantially includes the panoramic image area and has a highlight that always indicates the field of view and changes to the latter. This gives the user an excellent frame of reference that is highly useful if they have never physically been to the location before. The system can be used to view any type of area, inside or outside, or even celestial.

While the above description contains many specificities, these should not be construed as limitations on the scope of the invention, but rather as an exemplification of one preferred embodiment thereof. Many other variations are possible. For example, the panoramic image can be from a live video source and not just a static image. The map image can be generated from a geographic information system and not just a static image. As shown, the "highlighted" area of the map is actually made by darkening the rest of the map, but the detailed view area can be highlighted by making it lighter, in a different color, with darker lines, with border lines only, by shading, etc. The view can be changed by other than a mouse, e.g., by use of elevators in the side margins of the window of said detailed field of view, by keyboard commands, by voiced commands, by head or foot movements, etc. Instead of the geographic urban image shown, the images can be of a rural or natural area, in the inside or outside of a building. In the case of an inside-building image, it can be of a furnished or empty home, an apartment, etc. The viewer can be used on any type of image displayer, including CRT monitors, flat screen displays, mosaic displays, projection displays, mobile or vehicle displays (the map would be of an actual large geographic territory), interactive television displays, laptop, desktop, or mainframe computers, dedicated computers, dumb terminals or clients with the software in a server, etc.

Accordingly, the scope of the invention should be determined not by the embodiments illustrated, but by the appended claims and their legal equivalents.

I claim:

1. A method for displaying a detailed view of an area within a territory, taken from a predetermined location within said territory, and indicating the area and direction in which said detailed view is taken from within said territory, comprising:

providing a display that can display a map of a territory and a detailed view of an area within said territory, said detailed view being taken from a predetermined location within said territory, displaying said map of said territory on said display, displaying said detailed view, as taken from said predetermined location within said territory, as an image on said display, providing an input means for a human operator to change the angular direction and area of said detailed view as seen from said location within said territory, using said input means to change said angular direction and said area of said detailed view, thereby to move virtually through said territory, indicating on said map said angular direction and said area of said detailed view, thereby providing, on said map, an indication of said angular direction and said area of said detailed view as seen from said location within said territory, causing any change in said angular direction and said area of said detailed view to be simultaneously indicated by a corresponding change in said indication on said map, such that both said detailed view and said indication on said map change substantially simultaneously, thereby to create a highly interactive display, which allows a human operator to better understand, by looking at said map, the area and direction of said detailed view.

2. The method of claim 1 wherein said indicating on said map is done by causing said detailed view on said map to have a different brightness than the rest of said map.

3. The method of claim 2 wherein said rest of said map is darkened relative to said detailed view so that said detailed view is effectively highlighted.

4. The method of claim 1 wherein said change of angular direction or area of said detailed view is effected by manipulating the image of said detailed view.

5. The method of claim 1 wherein said change of angular direction or area of said detailed view is effected by manipulating said detailed view image on said map.

6. The method of claim 1 wherein said map of said territory is a geographical image.

7. The method of claim 1 wherein said map of said territory is an image of the inside of a building.

8. The method of claim 2 wherein said map and said detailed field are selectively arranged to change direction automatically and continuously.

9. The method of claim 1 wherein said input means for a human operator to change the angular direction and area of said detailed view is also arranged to change said location from where said detailed view is taken, said input means is used to change said augural direction and origin of said detailed view, and said map and said detailed view image are arranged to indicate any changes in angular direction and origin of said detailed view.

10. A system for indicating the origin, area, and angular direction of a detailed view of an area within a territory, as seen from a point within said territory, and for also indicating changes in said origin, area, and angular direction, comprising:

detail display means for displaying a detailed view of an area within a territory, as seen from a point within said territory, and for enabling a user to change the origin, area, and angular direction of said area shown in said detailed view, map display means for displaying a map of said territory and indicating the origin, area, and angular direction of said area within said territory, as shown in said detailed view, and synchronization means for changing, in said map, the origin, area, and angular direction of said territory shown in said detailed view, said changing occurring in response to and in correspondence with changes in the origin, area, and angular direction of said territory shown in said detailed view, or for changing said detailed view in response to and in correspondence with changes in the origin, area, and angular direction of said detailed view of said area of said territory shown in said map.

11. The system of claim 10 wherein said map display means is arranged to indicate the area of said territory shown in said detailed view in a different brightness than the rest of said map.

12. The system of claim 11 wherein said map display means is arranged to darken the rest of said image relative to said area so that said area is effectively highlighted.

13. The system of claim 10 wherein said synchronization means is responsive to manipulations of said detailed view.

14. The system of claim 10 wherein said synchronization means is responsive to manipulations of said area in said detailed view.

15. The system of claim 10 wherein said map is an image of a territory selected from the group consisting of geographic and inside-building images.

16. The system of claim 10 wherein said synchronization means is arranged to change direction and field of view of said map and said detailed view automatically and continuously.

17. A system for indicating the origin, area, and angular direction of a detailed view of an area within a territory, and for also indicating changes in said origin, area, and angular direction, as seen from a point within said territory, comprising:

a display for displaying a detailed view of an area of a territory, as seen from a point within said territory, and for enabling a user to change the origin, area, and angular direction of said area within said territory, as shown in said detailed view, map display means for displaying a map of said territory and indicating the origin, area, and angular direction said area of said territory shown by said detailed view, and a synchronizer for changing, in said map, the origin, area, and angular direction of said area of said area within said territory shown in said detailed view in response to and in correspondence with changes in said origin, area, and angular direction of said territory shown in said detailed view.

18. The system of claim 17 wherein said map display means is arranged to indicate the portion of said territory shown in said detailed view in a different brightness than the rest of said map.

19. The system of claim 18 wherein said map display means is arranged to darken the rest of said image relative to said field of view so that said the field of view is effectively highlighted.

20. The system of claim 17 further including:

a timer for automatically changing said field of view at a predetermined interval, and a timer stop for enabling an operator to end said automatic changing of said field of view.

21. The system of claim 17 wherein said territory represents a room in a building and said map image is a floor plan of said building.

22. The system of claim 17 wherein said territory represents a part of a geographical area and said map represents said geographical area.

23. A system for indicating the origin and area of a detailed view of an area within in a territory, as seen from a point within said territory, comprising:

a display for displaying a detailed view of an area within a territory as seen from a point within said territory, and for enabling a user to change the location of said point, said area, and the angular direction of said area as seen from said point, as shown in said detailed view, a map display for displaying a map of said territory and indicating said point, said area, and said angular direction of said area as seen from said point, as shown in said detailed view, and a synchronizer for changing, in said map, said point, said area, and said angular direction of said area within said territory indicated by said detailed view in response to and in correspondence with changes in said point origin, said area, or said angular direction as shown in said detailed view.

24. The system of claim 23 wherein said map display is arranged to indicate said area of said territory shown in said detailed view in a different brightness than the rest of said map.

25. The system of claim 24 wherein said map display is arranged to darken the rest of said image relative to said area of said territory so that said area is effectively highlighted.

26. The system of claim 23 further including:

a module for automatically changing said area at a predetermined interval, and a module for enabling an operator to end said automatic changing of said area.

27. The system of claim 23 wherein said territory represents a plan of a floor of a building and said detailed view shows a room on said floor of said building.

28. The system of claim 23 wherein said territory represents a geographical area and said detailed view shows a sector of said geographical area.

* * * * *

(12) INTER PARTES REVIEW CERTIFICATE (61st)
United States Patent
Jongerius

(10) Number: US 6,563,529 K1
(45) Certificate Issued: Mar. 23, 2015

(54) INTERACTIVE SYSTEM FOR DISPLAYING DETAILED VIEW AND DIRECTION IN PANORAMIC IMAGES

(75) Inventor: Jerry Jongerius

(73) Assignee: Empire IP LLC

Trial Number:

IPR2013-00191 filed Mar. 15, 2013

Petitioners: Google Inc.; Apple Inc

Patent Owner: Empire IP, LLC

Inter Partes Review Certificate for:

Patent No.: 6,563,529
Issued: May 13, 2003
Appl. No.: 09/416,505
Filed: Oct. 8, 1999

The results of IPR2013-00191 are reflected in this inter partes review certificate under 35 U.S.C. 318(b).

INTER PARTES REVIEW CERTIFICATE
U.S. Patent 6,563,529 K1
Trial No. IPR2013-00191
Certificate Issued Mar. 23, 2015

AS A RESULT OF THE INTER PARTES REVIEW PROCEEDING, IT HAS BEEN DETERMINED THAT:

Claims 1-6, 10-15, 17-19, 21, 23-25, 27 and 28 are cancelled.

\* \* \* \* \*